(12) United States Patent
Bando et al.

(10) Patent No.: US 8,896,261 B2
(45) Date of Patent: Nov. 25, 2014

(54) DOUBLY-FED GENERATOR AND DOUBLY-FED ELECTRIC MACHINE

(75) Inventors: Akira Bando, Hitachi (JP); Masaya Ichinose, Hitachiota (JP); Yasuhiro Kiyofuji, Hitachi (JP); Yasuaki Nakayama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 13/421,259

(22) Filed: Mar. 15, 2012

(65) Prior Publication Data

US 2013/0241463 A1 Sep. 19, 2013

(51) Int. Cl.
*H02P 9/00* (2006.01)
*H02J 3/00* (2006.01)
*H02P 27/08* (2006.01)

(52) U.S. Cl.
USPC .............. 318/810; 290/44; 307/153; 322/44; 318/811; 318/140

(58) Field of Classification Search
None
See application file for complete search history.

(56) References Cited

U.S. PATENT DOCUMENTS

| | | | |
|---|---|---|---|
| 5,436,819 A * | 7/1995 | Mikami et al. .................. | 363/41 |
| 7,485,980 B2 | 2/2009 | Ichinose et al. | |
| 8,097,971 B2 * | 1/2012 | Ichinose et al. ................. | 290/44 |
| 2003/0052643 A1 * | 3/2003 | Sweo ............................ | 318/801 |
| 2007/0210651 A1 * | 9/2007 | Ichinose et al. ................. | 307/64 |
| 2008/0157529 A1 * | 7/2008 | Rivas et al. ..................... | 290/44 |
| 2008/0303489 A1 * | 12/2008 | Park et al. ....................... | 322/20 |
| 2009/0278354 A1 * | 11/2009 | Ichinose et al. ................. | 290/44 |
| 2013/0241463 A1 * | 9/2013 | Bando et al. ................... | 318/810 |

FOREIGN PATENT DOCUMENTS

| | | |
|---|---|---|
| JP | 2007-244136 A | 9/2007 |
| JP | 2009-273281 A | 11/2009 |

OTHER PUBLICATIONS

Kita et al., "400-MW Adjustable-Speed Pumped-Storage Hydraulic Power Plant", 4th Plant at the Kansai Electric Power Co., Inc. Okawachi Power Station, Hitachi Review, 1995, vol. 44, No. 1, pp. 55-62 (eight (8) sheets).

* cited by examiner

*Primary Examiner* — Eduardo Colon Santana
*Assistant Examiner* — Devon Joseph
(74) *Attorney, Agent, or Firm* — Crowell & Moring LLP

(57) ABSTRACT

The excitation overcurrent detection unit for the doubly-fed electric machine is provided with a function to determine an excitation current magnitude relationship among three phases. The firing pulse is held to on-state or off-state to cause the largest-current phase and the second-largest-current phase to charge the DC capacitor by the operation of diodes. The conduction ratio of the third-largest-current phase or minimum current phase is controlled according to the detected current value to protect against a possible short-circuit across the DC capacitor. When the voltage of the DC capacitor exceeds a preset value, the voltage is suppressed by operating active or passive power devices.

20 Claims, 11 Drawing Sheets

DOUBLY-FED GENERATOR AND DOUBLY-FED ELECTRIC MACHINE

BACKGROUND OF THE INVENTION

The present invention relates to a doubly-fed motor/generator using an excitation power converter or to a doubly-fed electric machine.

A doubly-fed generator using an excitation power converter, or a doubly-fed variable-speed electric machine is able to control a reactive power output, as does a conventional synchronous generator/motor, and also to realize a high-speed torque control or a high-speed active power control within a rotation speed range around a synchronous speed. This gives the doubly-fed electric machines an advantage of being able to optimally operate prime movers, such as hydraulic power plants and wind power generation systems, in a wider range of conditions than can the conventional synchronous machines. They have another advantage of being able to contribute to stabilizing the frequency of the utility power system or power grid by temporarily releasing or absorbing energy of a rotating flywheel to and from the power grid.

As to the power converter for secondary excitation, not only does it have a far larger capacity than that of the excitation power converter for the conventional synchronous machine, though its capacity can be made smaller than that of an armature of the generator, its circuit is more complex. Therefore an overcurrent capability and an exciter ceiling voltage, equivalent to those of the excitation power converter of the conventional synchronous machine, are both economically difficult to secure.

For this reason, in the event of a fault occurring in a power grid, it is general practice to activate a short-circuit unit to allow an excitation winding overcurrent to bypass the excitation power converter, minimizing the overcurrent capacity. Where a resistor is inserted to reduce the current flowing through the short-circuit unit, in particular, the torque of the doubly-fed electric machine changes rapidly to that of the wound-rotor induction machine shorted with a secondary resistor and also wildly varies depending on the rotation speed. As a result, even if the generator can be managed to remain in operation, the large and rapid changes in the torque cause significant disturbances in the power grid, making it impossible to sustain the continued supply of electricity to consumers.

As one method to deal with this drawback, Hitachi Review, 1995 Vol. 44, describes a procedure whereby, when an excitation overvoltage is detected by a cycloconverter made up of anti-parallelly connected thyristors, a power converter unit of a polarity opposite to an excitation current command is turned on to continue its operation. Another method is also practiced which involves computing a loss from current values of power devices, calculating junction temperatures of the power devices from cooling water temperatures at all times and providing an overcurrent protection with a desired time delay by using the junction temperatures for protection in order to allow for a continued operation until a limit on the power device junction temperature is reached. This minimizes the activation of a short-circuit unit as practically as possible.

As self-turn-off power devices have been making remarkable technological advances in recent years, self-commutated converters are moving toward larger capacity and higher voltage by employing power devices such as IGBTs (Insulated Gate Bipolar Transistors). The self-commutated converters have advantages not found in externally commutated converters, such as capabilities to adjust a converter power factor and optimize the outflow of generated harmonics by adjusting a pulse-width-modulated (PWM) frequency. On the other hand, when used on doubly-fed generators that are required to continue their operation even during abnormalities on the power grid side, the power converters using the self-turn-off power devices have difficulty securing a short-time overcurrent capability economically. This is because, while the conventional power devices, such as thyristors, are able to provide a short-time overcurrent capability up to the junction temperature upper limit, the self-turn-off devices' current rating is determined by an instantaneous current interrupting capacity.

SUMMARY OF THE INVENTION

An object of this invention is to enable the secondary excitation control to be resumed after a minimal halt period in the event of a fault in the power grid, without providing a unit for short-circuiting and bypassing a circuit on the rotor excitation side of the doubly-fed machine even if the current rating of semiconductor power devices used in the excitation power converter is minimized.

To achieve the above objective, this invention provides a doubly-fed motor/generator which comprises: a wound-rotor induction machine having its stator side armature winding connected to an electric power grid; a first power converter having three-phase-bridge-connected arms of an IGBT as a self-turn-off power device and a free-wheeling diode or a MOSFET as a self-turn-off power device, each of the arms having its AC side terminals connected to a rotor side excitation winding of the wound-rotor induction machine, wherein the first power converter PWM-controls the self-turn-off power devices; a DC capacitor connected between DC side terminals of the first power converter; a second power converter having its DC side terminals connected to both terminals of the DC capacitor and its AC side terminals connected to the power grid; an excitation current sensor to detect a current flowing in an excitation winding of the wound-rotor induction machine; an excitation current controller to calculate an excitation current command value for a slip frequency equal to a difference between a grid frequency and a rotor frequency of the wound-rotor induction machine and to output a first pulse command that causes the detected excitation current value from the excitation current sensor to match the excitation current command value, the first firing pulse command being fed to the self-turn-off power devices of the first power converter; a pulse command controller having a function to identify a phase with a minimum absolute current value sent from the excitation current sensor, the pulse command controller being adapted to give an on/off-fixed firing pulse to self-turn-off power devices between two phases excluding the minimum current phase and the positive and negative poles so as to charge the DC capacitor, give a pulse modulation factor firing pulse calculated from the detected current value of the minimum current phase to self-turn-off power devices between the minimum current phase and positive and negative poles, and output the pulse modulation factor firing pulse and the on/off-fixed firing pulse as a second pulse command; and a pulse switching controller to switch the firing pulse command between the first pulse command and the second pulse command bidirectionally for output to the first power converter, the pulse switching controller being adapted to switch the firing pulse command from the first pulse command to the second pulse command under conditions including one that any of the absolute values of the detected current values from the excitation current sensor exceeds an overcurrent preset level 1 and to switch from the second pulse command to the first pulse command under conditions including one that the absolute values of all the detected three-phase current values from the excitation current sensor fall to or below an overcurrent preset level 2.

This invention also provides a doubly-fed motor/generator which comprises: a wound-rotor induction machine having its stator side armature winding connected to an electric power grid; a first power converter having three-phase bridge connected arms of an IGBT as a self-turn-off power device and a free-wheeling diode or a MOSFET as a self-turn-off power device, each of the arms having its AC side terminals connected to a rotor side excitation winding of the wound-rotor induction machine, wherein the first power converter pulse-width-modulation-controls the self-turn-off power devices; a DC capacitor connected between DC side terminals of the first power converter; a second power converter having its DC side terminals connected to both terminals of the DC capacitor and its AC side terminals connected to the power grid; an excitation current sensor to detect a current flowing in an excitation winding of the wound-rotor induction machine; an excitation current controller to calculate an excitation current command value for a slip frequency equal to a difference between a grid frequency and a rotor frequency of the wound-rotor induction machine and to output a first pulse command that causes the detected excitation current value from the excitation current sensor to match the excitation current command value, the first firing pulse command being fed to the self-turn-off power devices of the first power converter; a pulse command controller having a function to identify the three phases as a largest-current phase, a second-largest-current phase and a third-largest-current phase in order of decreasing magnitude of absolute current value sent from the excitation current sensor, the pulse command controller being adapted to check a polarity of the detected current value of the largest-current phase, fix to a turn-on side the firing pulse to either a self-turn-off power device P1 between the largest-current phase and a positive pole or a self-turn-off power device N1 between the largest-current phase and a negative pole so as to charge the DC capacitor, fix to a turn-off side the firing pulse to the other self-turn-off power device, fix the firing pulse to a self-turn-off power device P2 between the second-largest-current phase and the positive pole to the same side as the firing pulse to the self-turn-off power device N1 and fix the firing pulse to the a self-turn-off power device N2 between the second-largest-current phase and the negative pole to the same side as the firing pulse to the self-turn-off power device P1, and output a firing pulse of a pulse modulation factor calculated from the detected current value for the third-largest-current phase as a second firing pulse command to a self-turn-off power device P3 between the third-largest-current phase and the positive pole and to a self-turn-off power device N3 between the third-largest-current phase and the negative pole; and a pulse switching controller to switch the firing pulse command between the first pulse command and the second pulse command bidirectionally for output to the first power converter, the pulse switching controller being adapted to switch the firing pulse command from the first pulse command to the second pulse command under conditions including one that any of the absolute values of the detected current values from the excitation current sensor exceeds an overcurrent preset level 1 and to switch from the second pulse command to the first pulse command under conditions including one that the absolute values of all the detected three-phase current values from the excitation current sensor fall to or below an overcurrent preset level 2.

Further in the doubly-fed motor/generator of this invention, when the absolute value of any of the detected current values from the excitation current sensor exceeds the overcurrent preset level 1, a firing pulse constituting the second pulse command is issued to the self-turn-off power devices between the phase with the minimum absolute current value or the third-largest-current phase and the positive and negative poles; when the detected absolute current value of the minimum current phase or the third-largest-current phase is equal to or lower than the preset level, the pulse modulation factor is held to 50%; and when the detected absolute current value of the minimum current phase or the third-largest-current phase exceeds the preset level, the firing pulse is held to on-state or off-state to charge the DC capacitor.

Further in the doubly-fed motor/generator of this invention, when the absolute value of any of the detected current values from the excitation current sensor exceeds the overcurrent preset level 1, a firing pulse constituting the second pulse command is issued to the self-turn-off power devices between the phase with the minimum absolute current value or the third-largest-current phase and the positive and negative poles; when the detected absolute current value of the minimum current phase or the third-largest-current phase is equal to or lower than the preset level, the pulse modulation factor is held to 50%; and when the detected absolute current value of the minimum current phase or the third-largest-current phase exceeds the preset level, the firing pulse is held to on-state or off-state to discharge the DC capacitor.

The doubly-fed motor/generator of this invention further comprises: a rectifier circuit connected to the power grid, the rectifier circuit having its negative side output terminal connected to the negative side terminal of the DC capacitor and its positive side output terminal connected to a collector of a first diode, the DC capacitor having its positive side terminal connected to a collector of a second diode; a high value selection diode circuit made up of the first and second diode with their emitters commonly connected; and a DC voltage regulator having its positive side input terminal connected with the emitter of the high value selection diode circuit and its negative side input terminal connected with the negative side terminal of the DC capacitor, the DC voltage regulator having its output connected as a power supply to the excitation current controller.

The doubly-fed motor/generator of this invention further comprises: a DC voltage detector to detect a terminal voltage of the DC capacitor; and an active DC voltage suppressor circuit having a resistor and a self-turn-off power device PN serially connected; wherein the DC voltage detector and the active DC voltage suppressor circuit are connected parallelly between the terminals of the DC capacitor; wherein, when the detected DC voltage value exceeds a preset range, the self-turn-off power device PN of the active DC voltage suppressor circuit is on/off-controlled to suppress the DC voltage.

The doubly-fed motor/generator of this invention further comprises: a passive voltage suppressor circuit made up of a non-linear resistor of zinc oxide or the like parallelly connected between the terminals of the DC capacitor; wherein, when the terminal voltage of the DC capacitor rises close to an upper limit, the passive voltage suppressor circuit is triggered to start conduction to suppress the DC voltage.

The doubly-fed motor/generator of this invention further comprises: a current bypass circuit provided between the rotor side excitation winding of the wound-rotor induction machine and the excitation current sensor; wherein an overcurrent preset level 3 is greater than the overcurrent preset level 1 and, when any of the detected absolute current values from the excitation current sensor exceeds the overcurrent preset level 3, the current bypass circuit is triggered to be turned on and all the firing commands to the self-turn-off power devices of the first power converter are made off.

The doubly-fed motor/generator of this invention further comprises: a current bypass circuit and a DC voltage detector to detect a voltage of the DC capacitor, both provided between the rotor side excitation winding of the wound-rotor induction machine and the excitation current sensor; wherein, when the voltage from the DC voltage detector exceeds a preset range, the current bypass circuit is triggered to be turned on and all the firing commands to the self-turn-off power devices of the first power converter are made off.

The doubly-fed motor/generator of this invention further comprises: a temperature estimation circuit to estimate heat generated by the power devices using the excitation currents from the excitation current sensor and the firing commands to the first power converter and to supply the estimated heat value to a phase delay circuit that simulates a thermal capacity; wherein, when a temperature estimated by the temperature estimation circuit exceeds a preset value, the current bypass circuit is triggered to be turned on and all the firing commands to the self-turn-off power devices of the first power converter are made off.

Further, to achieve the above objective, this invention provides a doubly-fed motor/generator which comprises: a wound-rotor induction machine having its three-phase stator side windings connected to an electric power grid; a first power converter having semiconductor power devices connected at their AC side terminals to the three-phase rotor side windings of the wound-rotor induction machine; a DC capacitor connected between DC side terminals of the first power converter; a second power converter having its DC side terminals connected to both terminals of the DC capacitor and its AC side terminals connected to the power grid; an excitation current sensor to detect an excitation current of each phase supplied from the first power converter; and an excitation current controller to output a first firing pulse command to the semiconductor power devices of the first power converter to control the excitation current produced by the first power converter according to an operation condition of the wound-rotor induction machine; wherein the firing pulse to the semiconductor power devices of at least one of the three phases on the positive and the negative polarity side in the first power converter is held to a turn-on side or a turn-off side to charge the DC capacitor.

Further, in the doubly-fed motor/generator of this invention, a circuit between the positive and negative side terminals of the DC capacitor is used as a power supply for the excitation current controller.

The doubly-fed motor/generator of this invention further comprises: a DC voltage regulator connected between the positive and negative side terminals of the DC capacitor; wherein an output of the DC voltage regulator is used as a power supply for the excitation current controller.

A further object of this invention is to provide a doubly-fed variable-speed electric machine having the function of the doubly-fed motor/generator described above. Upon detection of an excitation overcurrent caused by a power grid fault, gates to the self-turn-off power devices in the largest phase and the second largest phase in terms of three-phase excitation current absolute value are fixed so as to prevent possible failures of the power devices due to switching. As to the remaining minimum current phase, when its absolute current value is equal to or less than a preset value, the gates of the self-turn-off power devices in that phase is pulse-width-modulated with a constant conduction ratio; and when its absolute current value is higher than the preset value, the gates are fixed to on-state or off-state. The use of this gate pattern prevents a short-circuit across the DC capacitor until power grid disturbances converge to a point where the excitation currents for all three phases fall below the preset value, at which time the PWM control is resumed by using the normal pulse commands from the excitation current controller.

Then, the polarity of the detected current value of the largest-current phase is checked. The firing pulse to either the power device P1 or N1 is fixedly held to on-state and that of the other to off-state to charge the DC capacitor. This allows the current to flow in a direction that charges the DC capacitor at all times, thus preventing a loss of DC voltage.

As for the remaining third phase, the DC capacitor charging current varies depending on its conduction ratio. If the firing pulse to a power device P3 or N3 is fixedly held to on-state to charge the DC capacitor, the charging current becomes maximum, equal to the absolute current value of the largest-current phase. If the firing pulse is fixed to off-state, the charging current becomes minimum, equal to the absolute current value of the second-largest-current phase. The latter procedure is more suited to suppressing a DC voltage rise. When the conduction ratio is set to 50%, the resultant charging current is between the maximum and the minimum.

Torque variations and DC voltage rises are in a trade-off relationship. The firing pulse for the third-largest-current phase may be switched between different sides depending on the mode of a fault in the power grid. For example, when a single-line-to-ground fault is detected from the utility voltage, a priority may be given to suppressing the torque variation by holding the firing pulse to the third-largest phase to the charging side. In the event of a 3-line ground fault, a priority may be given to suppressing the DC voltage by holding the firing pulse to the discharging side. In general, however, when the absolute current value of the third-largest-current phase exceeds a threshold, it often proves to be appropriate to fix the firing pulse to the discharging side.

Therefore, the objective of this invention is achieved by providing the excitation overcurrent detection unit for a doubly-fed generator/motor with a function of checking an excitation current magnitude relationship among three phases, fixing a firing pulse so as to cause the largest-current phase and the second-largest-current phase to charge the DC capacitor through diode operation, controlling the conduction ratio of the third-largest-current phase according to its detected current value to protect against a short-circuit across the DC capacitor and, when the voltage of the DC capacitor exceeds a preset value, suppressing the voltage value by active or passive devices.

The short-circuit unit described above refers to a "protective crowbar circuit" and further to a "resistor-shorting circuit" shown in JP-A-2009-273281.

In the event of a voltage fall caused by a lightning-induced ground fault in a power grid in particular, the doubly-fed generator of this invention can contribute to a stable operation of the grid by minimizing torque fluctuations in the doubly-fed generator and at the same time maximizing the operation continuation capability of the generator.

Other objects, features and advantages of the invention will become apparent from the following description of the embodiments of the invention taken in conjunction with the accompanying drawings.

DESCRIPTION OF THE EMBODIMENTS

Embodiment 1

Figure 1:
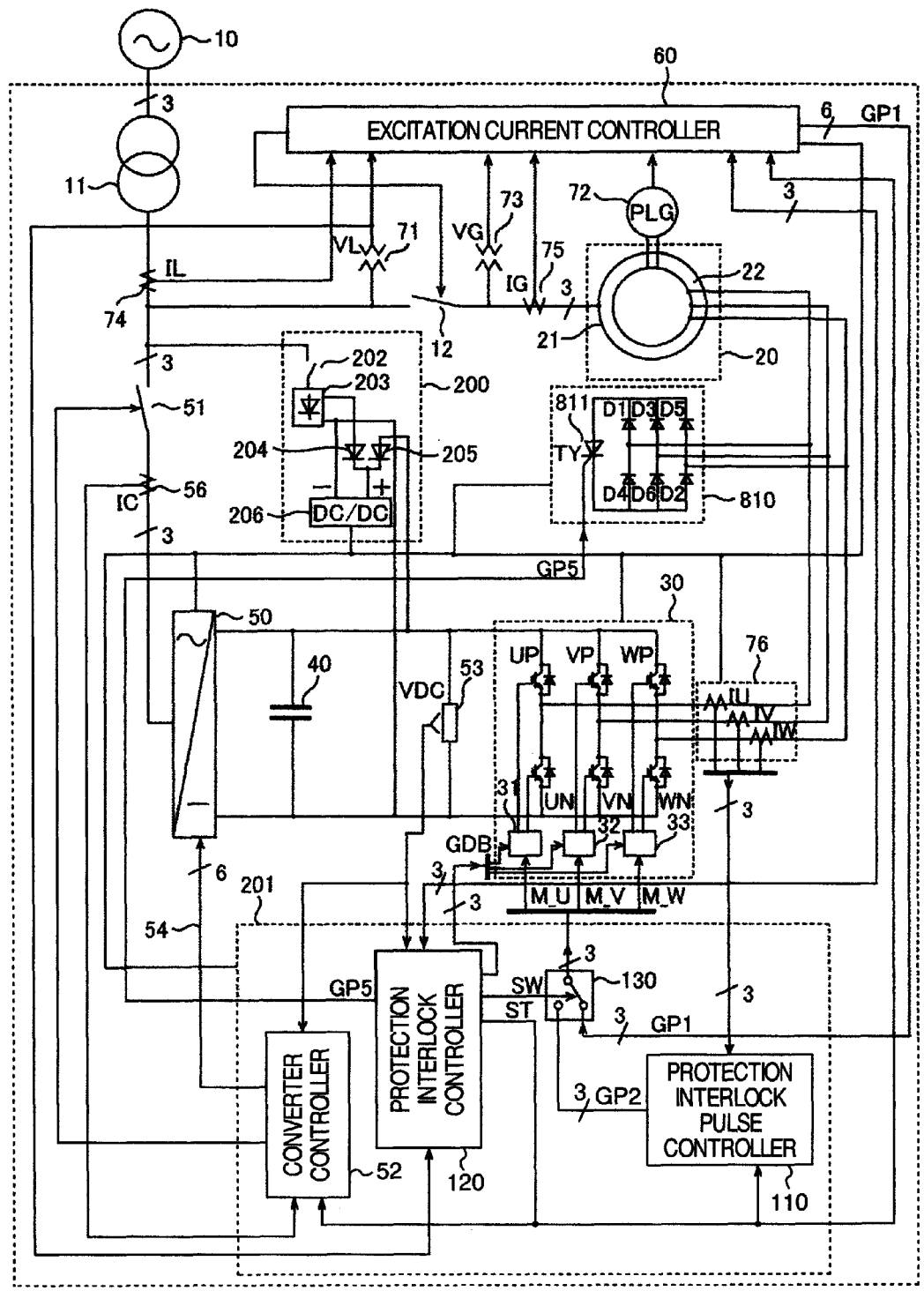
FIG. 1 is a circuitry of a doubly-fed electric machine as one embodiment of this invention.

The configuration of embodiment 1 according to this invention will be explained by referring to FIG. 1.

In this embodiment, as a doubly-fed generator, a doubly-fed electric machine commonly used in a wind power generation system is employed, with a stator side armature winding 21 of a wound-rotor induction machine connected to a power grid 10 through a transformer 11 and a circuit breaker 12.

A first power converter 30 has six three-phase bridge connected arms (UP, VP, WP, UN, VN, WN), each made up of anti-parallelly connected self-turn-off power device and diode, and is controlled to turn on and off by pulse width modulation commands (M_U, M_V, M_W). A capacitor 40 is connected between DC side terminals of the first power converter 30. The internal configuration of the first power converter 30 will be described later referring to FIG. 10.

A second power converter 50 has its DC side terminals connected to both ends of the capacitor 40 and its AC side terminals connected to those terminals of the transformer 11 on the opposite side of the AC power system.

An excitation current controller 60 uses a utility voltage VL from a voltage transformer 71 and a rotation phase from a rotation phase detector 72 directly coupled to a rotating shaft of the wound-rotor induction machine 20 to compute a reference signal of slip frequency equal to a difference between a utility frequency and a rotation phase frequency. The controller 60 also calculates a direct axis current command Idref so that a generator voltage VG from a voltage transformer 73 will agree with a command value and a quadrature axis current command Iqref so that an active power feedback signal PL, calculated from the utility voltage VL and a utility current IL from a current transformer 74, will agree with a command value.

The direct axis current command Idref may be controlled so that a reactive power feedback signal QL, calculated from the utility voltage VL and the utility current IL from the current transformer 74, will match the command value. The quadrature axis current command Iqref may be controlled so that a feedback value will agree with a torque command value. In that case, the torque feedback value is computed from values that are 2-axis-converted from a generator stator current IG from a current transformer 75 and excitation currents (IU, IV, IW).

Further the excitation current controller 60 outputs pulse width modulation commands (M_U, M_V, M_W) to the first power converter 30 so that three-phase instantaneous current command values (iuref, ivref, iwref) of slip frequency corresponding to the two-axis current commands (Iqref, Idref) and the excitation currents IU, IV, IW from a DC current transformer 76 will agree.

Figure 10:
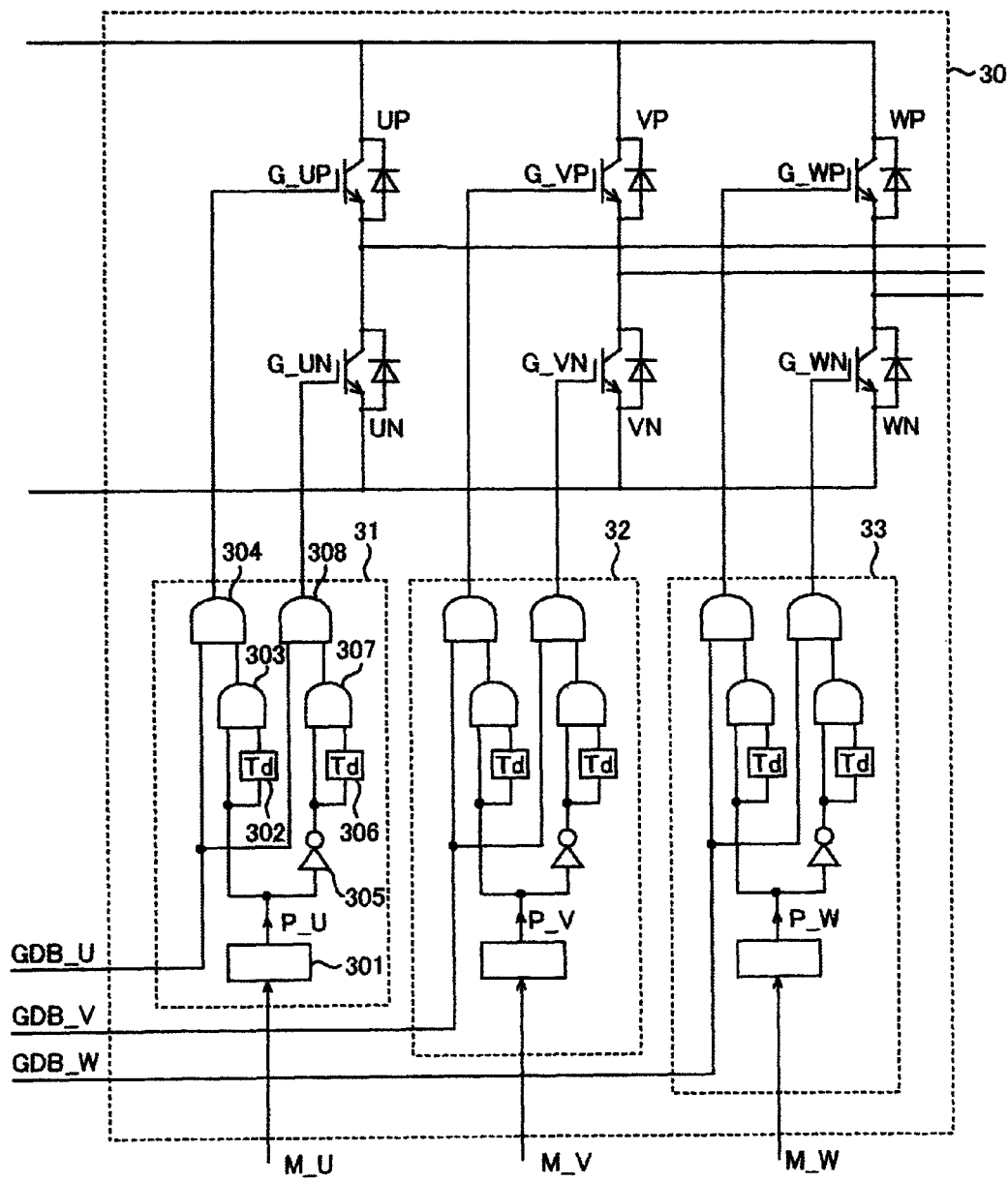
FIG. 10 shows an internal configuration of the first power converter 30.

The inner configuration of the first power converter 30 will be explained by referring to FIG. 10. Gate controllers 31, 32, 33 take in the pulse width modulation commands (M_U, M_V, M_W) from the excitation current controller 60 and outputs gate signals G_UP, G_UN, G_VP, G_VN, G_WP, G_WN to the self-turn-off power devices. The configuration and operation of the gate controller 31, 32, 33 are the same for all three phases. So, explanation will be given for only U phase.

Figure 11:
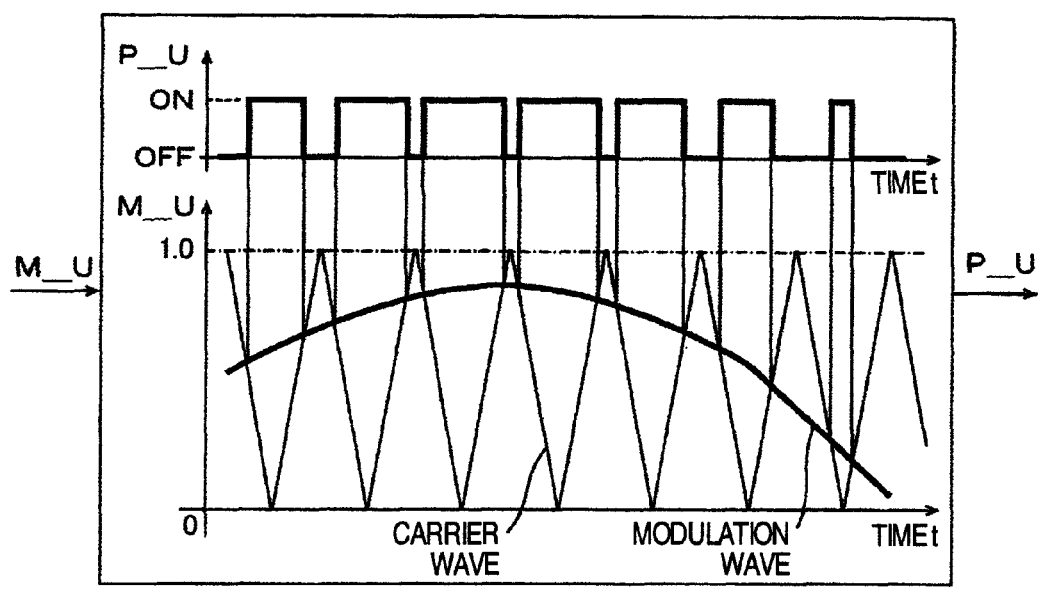
FIG. 11 shows an operation of a pulse width modulator.

The operation of a pulse width modulator 301 is shown in FIG. 11. A pulse width modulation command M_U is taken as a modulation wave and its magnitude is compared with that of a triangular carrier wave. When M_U is greater, a pulse command P_U turns on (level 1). When M_U=1, P_U is held turned on. When M_U=0, P_U is held turned off (level 0). When M_U=0.5, the on-period and the off-period are equal. This pulse command P_U is branched and put into a delay circuit 302 with a time delay Td. The output of the delay circuit 302 and the P_U are fed into an AND logic circuit 303 to prevent the capacitor 40 from being shorted by the simultaneous conduction of the UP arm and the UN arm.

A gate deblock signal GDB_U output from a protection interlock controller 120 is on (level 1) during normal operation and, in the event of an anomaly, off (level 0). This GDB_U signal and the output of the AND logic circuit 303 are fed to an AND logic circuit 304, which sends its output as a gate signal G_UP to the self-turn-off power devices of the UP arm. This allows the gate signal G_UP to be turned off by turning off the GDB_U signal from the protection interlock controller 120, without manipulating the signal of the AND logic circuit 303.

As for the gate signal G_UP to the self-turn-off power devices of the UN arm, the pulse command P_U is inverted in its on-off level by a NOT logic circuit 305 before being fed into a delay circuit 306 with a time delay Td. Then the output of the delay circuit and the output of the NOT logic circuit 305 are supplied to an AND logic circuit 307. Further, the gate deblock signal GDB_U from the protection interlock controller 120 and the output of the AND logic circuit 307 are fed to an AND logic circuit 308, which sends its output as a gate signal G_UN to the self-turn-off power devices of the UN arm.

With the above configuration and operation, a doubly-fed electric machine can be paralleled with the power grid 10, with the circuit breaker 12 and the converter side circuit breaker 51 closed.

To start the doubly-fed machine for the first time, the circuit breaker 51 is closed by a command from a converter controller 52, followed by a charging resistor not shown being closed and by a command signal 54 being adjusted so that a DC voltage VDC feedback from a DC voltage detector 53 is charged to a predetermined value. When the charging is complete, the charging resistor not shown is opened.

To start the second power converter 50 after the capacitor 40 charging is finished, the converter controller 52 computes a quadrature axis current vector command Iqcref that makes the DC voltage VDC reach the set value and also a direct axis current vector command Idcref that causes a power factor calculated from the utility voltage VL from a voltage transformer 55 and a converter current IC from a current transformer 56 to become 1.

The converter controller 52 further computes three-phase instantaneous current command values from the two-axis current commands and outputs a command signal 54 that causes the three-phase instantaneous current command values to agree with the converter current IC.

After the wound-rotor induction machine 20 has been accelerated into an operation range of rotation speed, the excitation current controller 60 performs the following steps to excite the armature winding 21: holding the quadrature axis current command Iqref to 0, adjusting a slip frequency phase signal so that the phase of the utility voltage signal VL and the phase of a generator voltage signal VG match and adjusting the vertical current command Idref so that amplitudes of these two signals agree. When their match in phase and amplitude is confirmed, the synchronous circuit breaker 12 is closed to start a parallel operation.

Any abnormality on the excitation side of the doubly-fed electric machine is detected when the excitation current (IU, IV, IW) or the DC voltage VDC moves out of a predetermined range.

The doubly-fed generator has a protection interlock pulse controller 110, a protection interlock controller 120 and a pulse switching unit 130. The pulse switching unit 130 selects between GP1 and GP2. When the absolute value of any of the excitation currents IU, IV, IW exceeds I1 or the DC voltage VDC exceeds VD1, the protection interlock controller 120 changes the command SW to the pulse switching unit 130 from level 1 to level 0 to switch the pulse width modulation commands (M_U, M_V, M_W) to the first power converter from GP1 to GP2. At the same time, the protection interlock controller 120 issues a command ST to the excitation current controller 60 to cause it to hold an integrator output in a current control computation unit therein and sets a difference between the command value and the input to 0. When absolute value of the excitation current IU, IV, IW goes below I2, the protection interlock controller 120 changes the command SW from level 0 to level 1 to switch the pulse width modulation commands (M_U, M_V, M_W) from pulse command GP2 to GP1. Here it is set at I1>I2. It then resumes inputting quantities to the integrator in the excitation current controller 60 by the command ST and also resets the output holding.

The example of FIG. 1 detects when the utility voltage VL goes out of the preset range, and makes setting to prevent the pulse switching unit 130 from being operated undesirably by other factors than abnormalities on the power grid. This can minimize undesired operations of the pulse switching unit 130.

A control power supply unit 200 supplies power to a controller 201 including a control computation circuit and a microcomputer, the first power converter 30, the second power converter 50 and the excitation current controller 60. The control power supply unit 200 comprises a contactor 202 connected to the transformer 11 on the side opposite the AC power system, a rectifier 203 and a DC voltage regulator 206 that inputs DC power from the DC capacitor circuit or the rectifier through high value selection circuit diodes 204, 205. With this configuration, before the DC capacitor is charged, the control power supply unit 200 supplies power from the rectifier and, when the AC voltage drops in the event of a fault on the power grid side, supplies control power from the DC capacitor circuit.

With this embodiment of this invention, therefore, a voltage fall in an excitation circuit 22 of the wound-rotor induction machine resulting from the operation of a short-circuit unit 810 and the first power converter in the event of a fault on the power grid side can be prevented from causing a voltage drop in the DC capacitor. This offers an advantage of being able to eliminate the need for an uninterruptible power supply that has been required for securing the control power supply during abnormal conditions.

Figure 2:
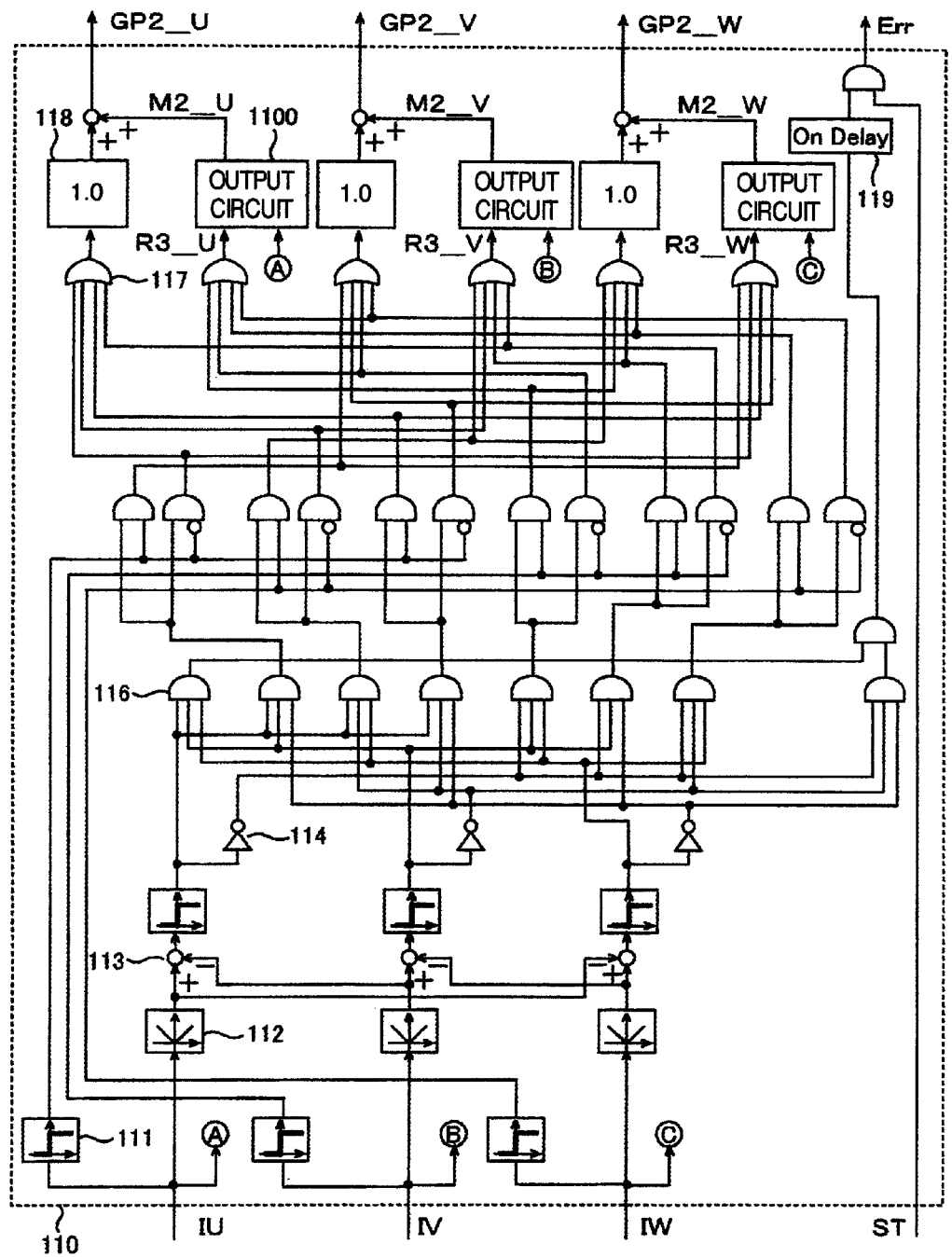
FIG. 2 shows a configuration of a protection interlock pulse controller 110.

FIG. 2 shows an embodiment of the protection interlock pulse controller 110.

A comparator 111 produces an on (level 1) output when its input signal is positive, and has an absolute value calculator 112 that outputs an absolute value of the input signal, a NOT logic circuit 114 and an AND logic circuit 115. Using these the comparator compares the magnitudes of the three-phase excitation currents IU, IV, IW. It identifies a maximum value as the first phase, a middle value as the second phase and a minimum value as the third phase.

An output circuit 118 outputs a gate command GP2_U through an AND logic circuit 116 and an OR logic circuit 117. When the U phase as its output is the first phase and the current value is negative or when the U phase is the second phase and the current value is positive, the output circuit 118 has its input turned on (level 1) and produces a modulation factor of 1.0 at its output.

Further, an output circuit 1100 computes and outputs a gate command when the U phase as its output is the third phase. It takes in a calculation result R3_U from the AND logic circuit 116 and the OR logic circuit 117 and the excitation current IU to produce a gate command M2_U at its output. The internal configuration of this output circuit will be described later referring to FIG. 3.

An on-delay circuit 119 produces an error signal ERR when, while the state signal ST represents an operation state other than 0, the AND logic circuit 115 continually outputs a logically inconsistent result of the current magnitude comparison.

With the above configuration, when the absolute value of IU, for instance, is the largest and positive (current flows from the converter to the generator side), GP2_U is held at 0. When the absolute value is negative, GP2_U is held at 1. Further the absolute value of IV is the second largest, GP2_V is held at an inverted GP2_U or 1−GP2_U.

Figure 3:
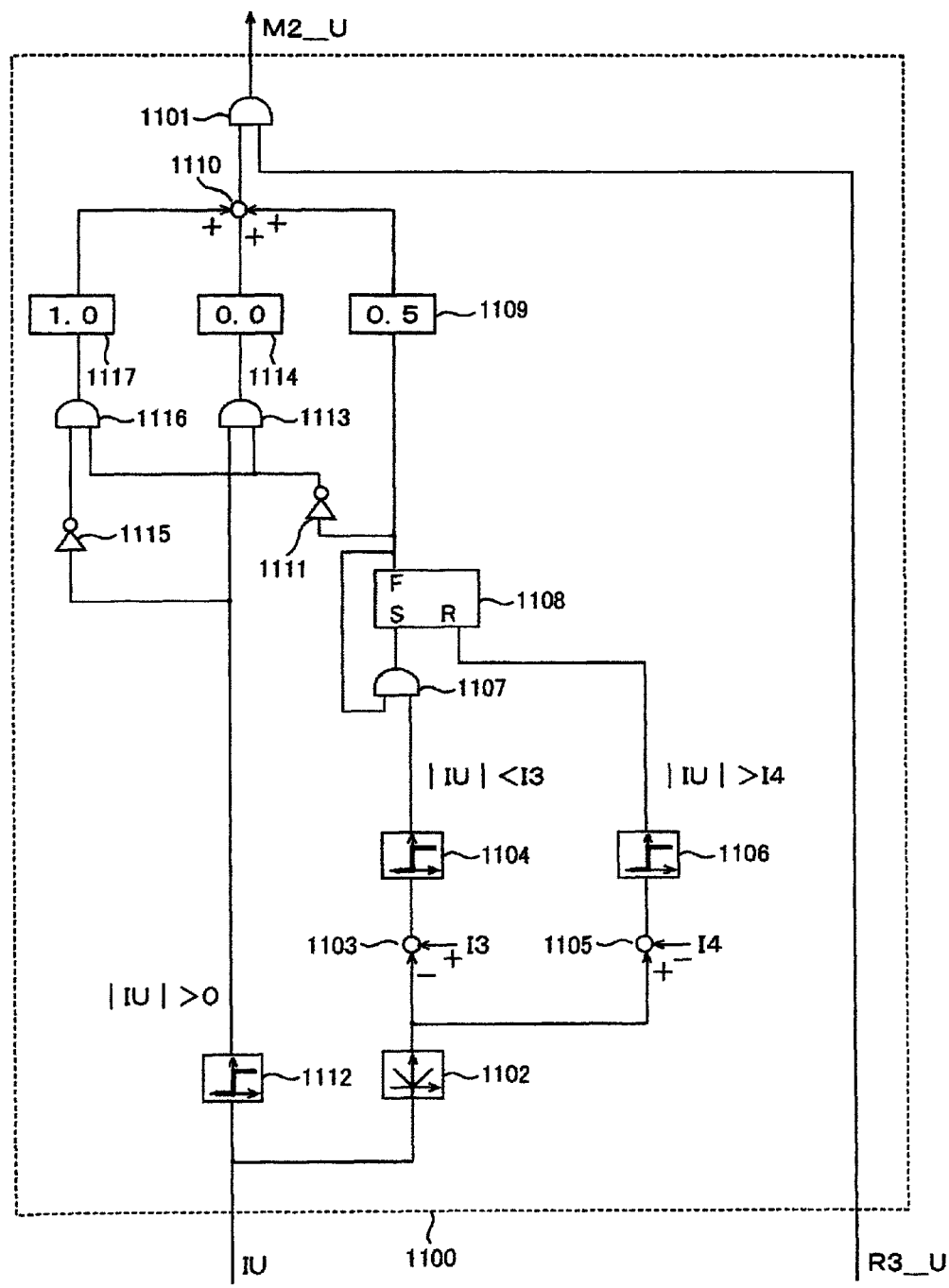
FIG. 3 shows a configuration of an output circuit 1100.

An example of the output circuit 1100 is shown in FIG. 3. The figure shows a circuit for a U phase output. The V phase and W phase also have the same circuit configurations and their explanations are omitted.

An AND logic circuit 1101 produces an output gate signal M2_U when an input signal R3_U is on (level 1).

The output circuit 1100 calculates an absolute value of the excitation current IU with an absolute value calculator 1102 and puts it through a subtractor 1103 to a comparator 1104. The comparator 1104 turns on when the current absolute value is smaller than I3. The excitation current absolute value is also input through a subtractor 1105 to a comparator 1106. The comparator 1106 turns on when the current absolute value is larger than I4. A preset magnitude relationship is I3<I4. The output of the comparator 1104 and the output of the comparator 1106 are fed, as a set signal and a reset signal respectively, to an AND logic circuit 1107 and a flip-flop 1108 to activate a modulation factor-0.5 output element 1109.

A NOT logic circuit 1111 is an output gate that produces its output when its input is not the modulation factor-0.5 output.

The excitation current signal IU is checked by a comparator 1112 for its sign. If IU is positive, it is supplied through an AND logic circuit 1113 to a modulation factor-0.0 output element 1114 for operation. If IU is negative, it is fed through an AND logic circuit 1116 to a modulation factor-1.0 output element 1117 for operation.

The output elements 1109, 1114, 1117 output their set values when their inputs are on and, when otherwise, output 0. So, an adder 1110 operates as a switch for the output circuits 1109, 1114, 1117.

In the above configuration, when the W phase has the smallest current absolute value and the current absolute value becomes smaller than the set value I3, the output circuit 1100 holds the pulse width modulation factor at 50% (MP2_W=0.5). When it becomes larger than the set value I4, the output circuit 1100 holds MP2_W at 1.0 or 0.0 to discharge the capacitor, depending on the polarity of the current value IW. Another method may also be employed whereby the output element 114 and the output element 117 of FIG. 3 are exchanged to hold the MP2_W in a direction that charges the capacitor, placing a greater importance on minimizing torque variations.

When a duration in which the current absolute values of all three phases remain greater than a preset value I0 exceeds a preset time, the rotor circuit 22 is short-circuited for three phases by a GP5 command to initiate a stop sequence. The preset value I0 is I0>I1.

Figure 4:
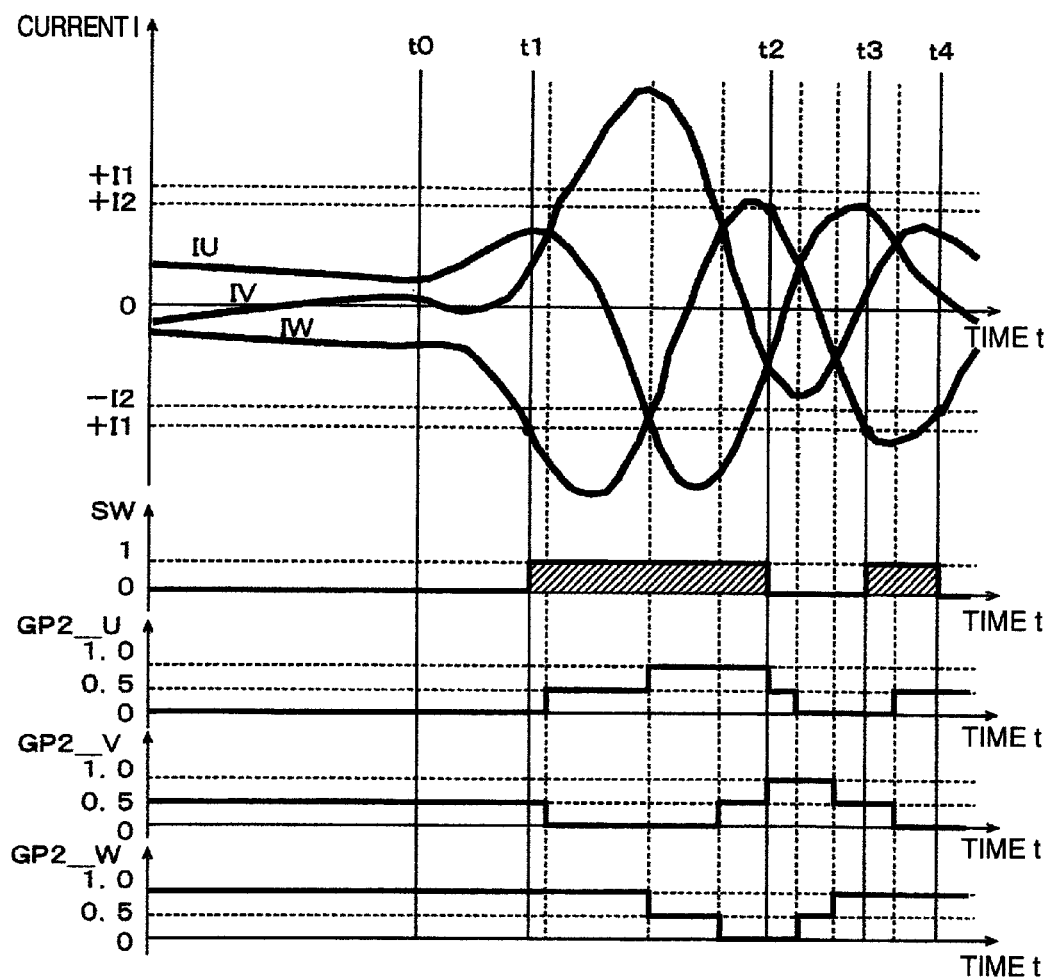
FIG. 4 shows an operation of the doubly-fed electric machine of this invention.
Figure 5:
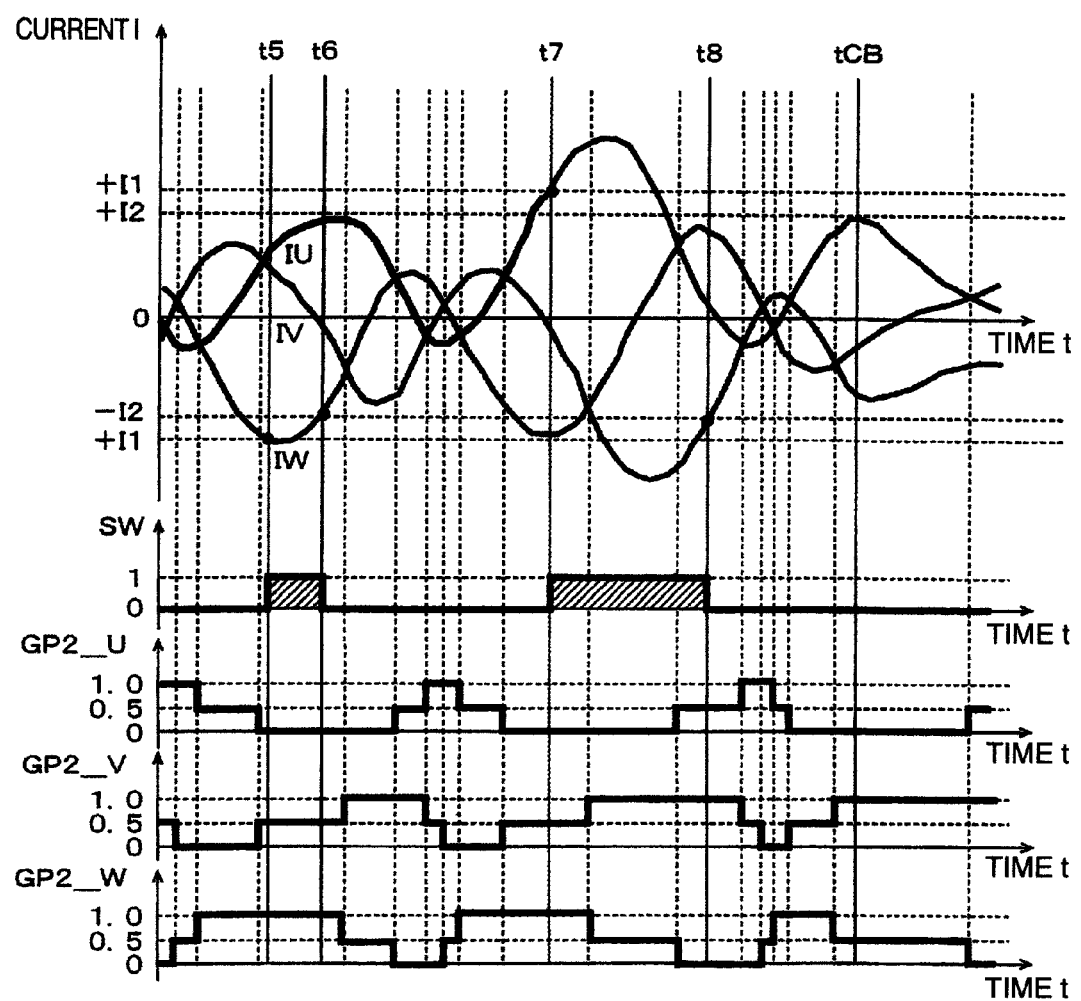
FIG. 5 shows an operation of the doubly-fed electric machine of this invention.

FIG. 4 and FIG. 5 show the operations of the doubly-fed electric machine that implements the present invention. In this embodiment, a setting is made so that I1=I4 and I2=I3.

When a ground fault occurs at time t0 in FIG. 4, the absolute value of IW exceeds the set value I1 at time t1, causing the SW of the pulse switching unit 130 to rise to level 1, which in turn allows the output GP2 of the protection interlock pulse controller 110 to begin to be fed as a command to the first power converter 30. At time t2, the absolute current values of all three phases become smaller than the set value I2, causing the SW to fall to level 0 to restore the gate command GP1 from the excitation current controller 60 to the power converter 30. Then at time t3, IW again exceeds the set value I1, causing SW to rise to level 1 and stay there until time t4, at which time SW returns to level 0.

FIG. 5 shows the operation of the generator electric machine at around time tCB when a circuit breaker on the grid 10 side of the transformer 11 operates. The SW is at level 1 during periods from t5 to t6 and from t7 to t8. In this example, after the circuit breaker operation the SW stays at level 0, during which time the generator operation is continued by the excitation control command GP1 that is issued during normal condition from the excitation current controller 60.

As described above, a total of the periods in which the SW is at level 1 to cope with grid side abnormalities is shorter than the time duration from a ground fault to a circuit breaker operation. This invention therefore provides a capability of minimizing disturbances on the grid side.

Embodiment 2

Figure 6:
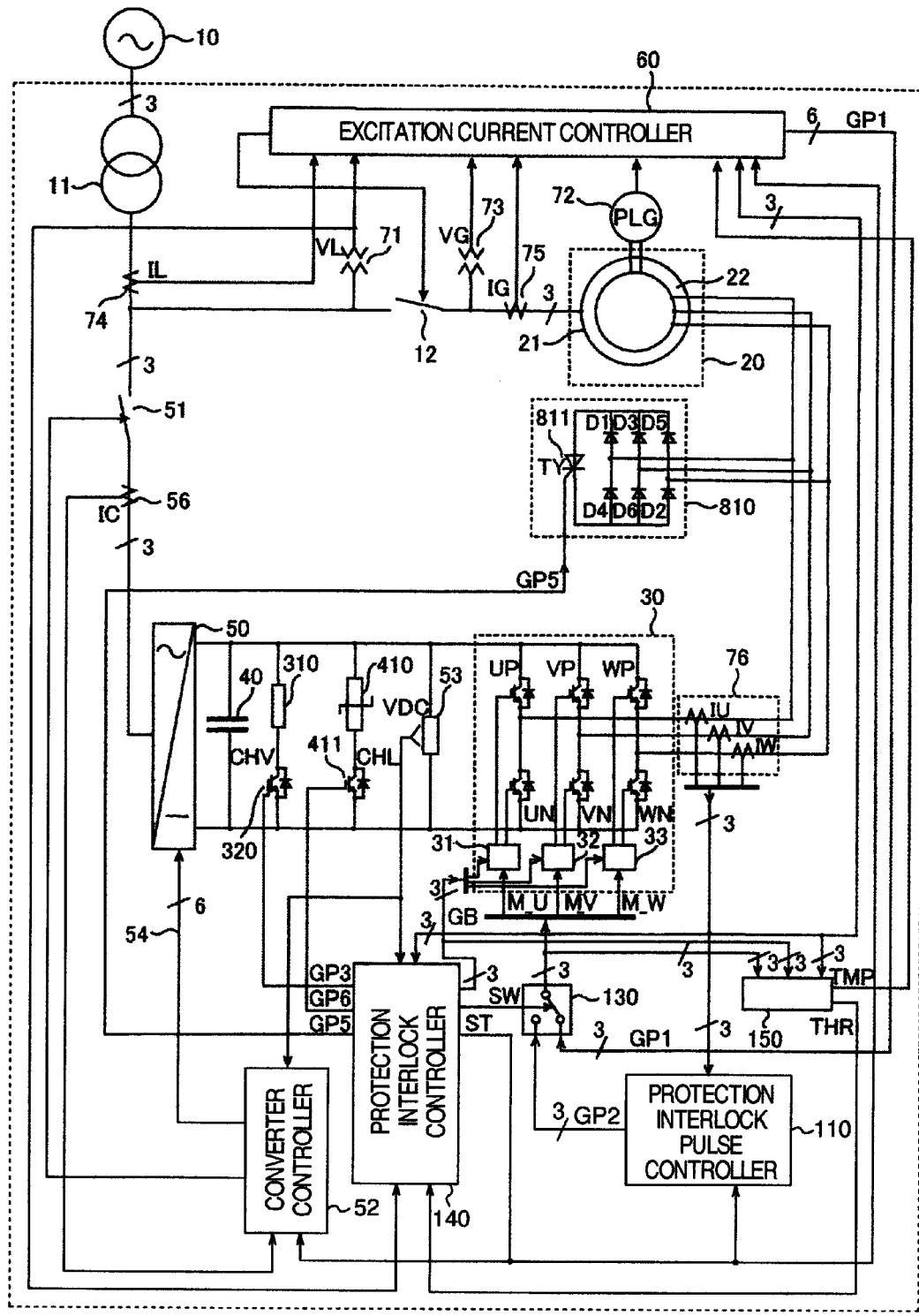
FIG. 6 is a circuitry of a doubly-fed electric machine as another embodiment of this invention.
Figure 7:
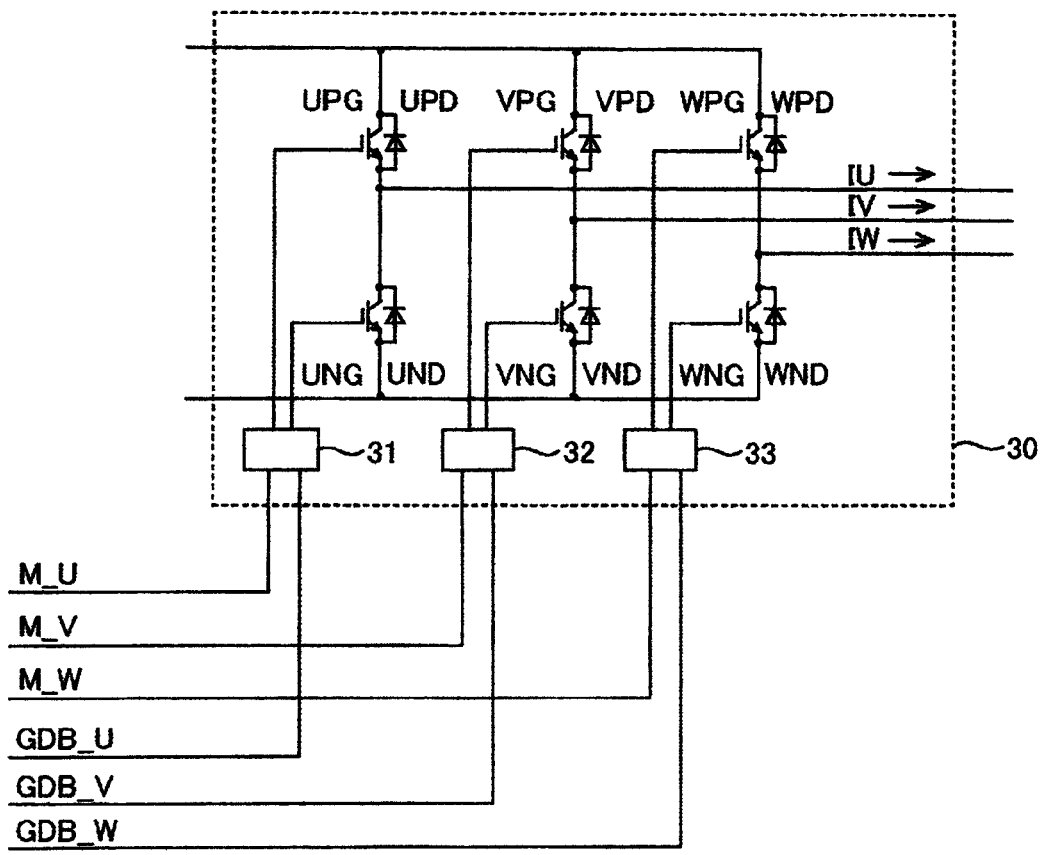
FIG. 7 shows a configuration of six arms of IGBTs making up a first power converter 30.

FIG. 6 shows a second embodiment of this invention.

A resistor 310 and a self-turn-off device 320 (CHV) form a circuit to minimize a voltage increase in the DC circuit. When the DC voltage VDC exceeds a preset value VD1, a firing command GP3 from a protection interlock controller 140 is turned on to lower the voltage. When the DC voltage goes below a preset value VD2, the GP3 is turned off. This arrangement allows the operation to continue even when the energy, which is triggered by GP2 to flow in from the rotor circuit 22 of the wound-rotor induction machine, fails to be released to the grid side by the control of the second power converter, resulting in a voltage increase.

A non-linear resistor 410 using a zinc oxide device is able to suppress a voltage increase in a DC circuit and may be used in place of the resistor 310 and the self-turn-off device 320 (CHV) or in combination.

FIG. 6 represents an example in which the non-linear resistor 410 is connected with a self-turn-off device 411 (CHL). When the suppression voltage of the non-linear resistor 411 is lowered to widen a setting range of the DC voltage, a problem of heat caused by a leak current of the non-linear resistor arises. To prevent this, a command GP6 is turned on when GP2 is activated. This ensures a reliable suppression of an increase in VDC and also limits a conduction period of the non-linear resistor, t41, to the sum of a VDC overvoltage detection period t42 and a CHV turn-on period t43 (t41=t42+t43), thus reducing the heat capacity of the non-linear resistor.

A device temperature protection unit 150 for the power converter 30 takes in excitation current values (IU, IV, IW) from an excitation current sensor 76, pulse modulation commands (M_U, M_V, M_W) sent to the power converter 30 and an inlet temperature TW of cooling water to the power converter 30, and outputs a temperature anomaly detection signal THR to the protection interlock controller 140. When an abnormal device temperature is detected, the signal THR changes from off (level 0) to on (level 1), causing the protection interlock controller 140 to enter into a stop sequence, similar to the one that is initiated in the event of an excitation side anomaly, such as abnormal conditions of excitation currents (IU, IV, IW) and DC voltage VDC.

The device temperature protection unit 150 calculates a loss for each of 12 arms in total—six arms of IGBT devices (UPG, UNG, VPG, VNG, WPG, WNG)—and six arms of antiparallel diodes (free-wheeling diodes) (UPD, UND, VPD, VND, WPD, WND)—and sends the calculated losses to a transient heat characteristic approximating phase delay circuit to determine junction temperatures in real time. When the device temperature of any of the 12 arms exceeds a preset value, the protection unit 150 outputs the anomaly detection signal THR.

Figure 8:
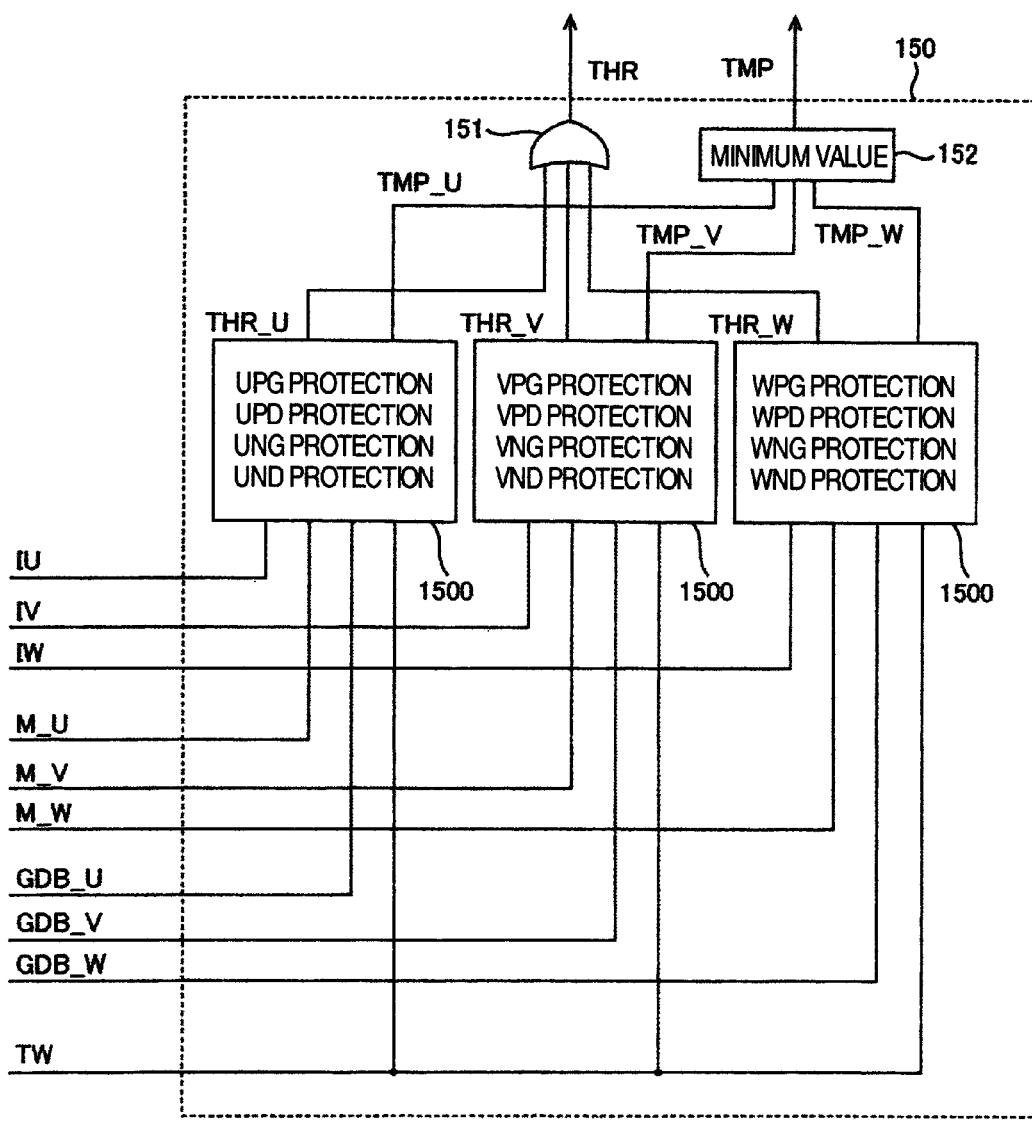
FIG. 8 shows a configuration of an IGBT temperature protection unit 150.

FIG. 8 shows an embodiment of the device temperature protection unit 150. The inner circuit of the device temperature protection unit 150 is divided into three sections, each constituting a temperature protection circuit 1500 that detects a temperature abnormality for each set of four devices connected to one of the three phases U, V, W. The three temperature protection circuits produce anomaly detection signals THR_U, THR_V, THR_W, respectively. These outputs are fed to an OR logic circuit 151 that produces a temperature anomaly detection signal THR when there is an anomaly on any of the 12 devices.

Each temperature protection circuit 1500 produces a temperature margin minimum value TMP_U, TMP_V, TMP_W for four devices and a minimum value output circuit 152 outputs a device temperature margin TMP for the first power converter. By supplying the device temperature margin TMP to the excitation current controller 60 and, from there, further transmitting it to an upper-level system controller, an output upper limit of the doubly-fed electric machine can be adjusted according to the device temperature margin TMP. This makes it possible to produce a maximum output while securing reliability.

Figure 9:
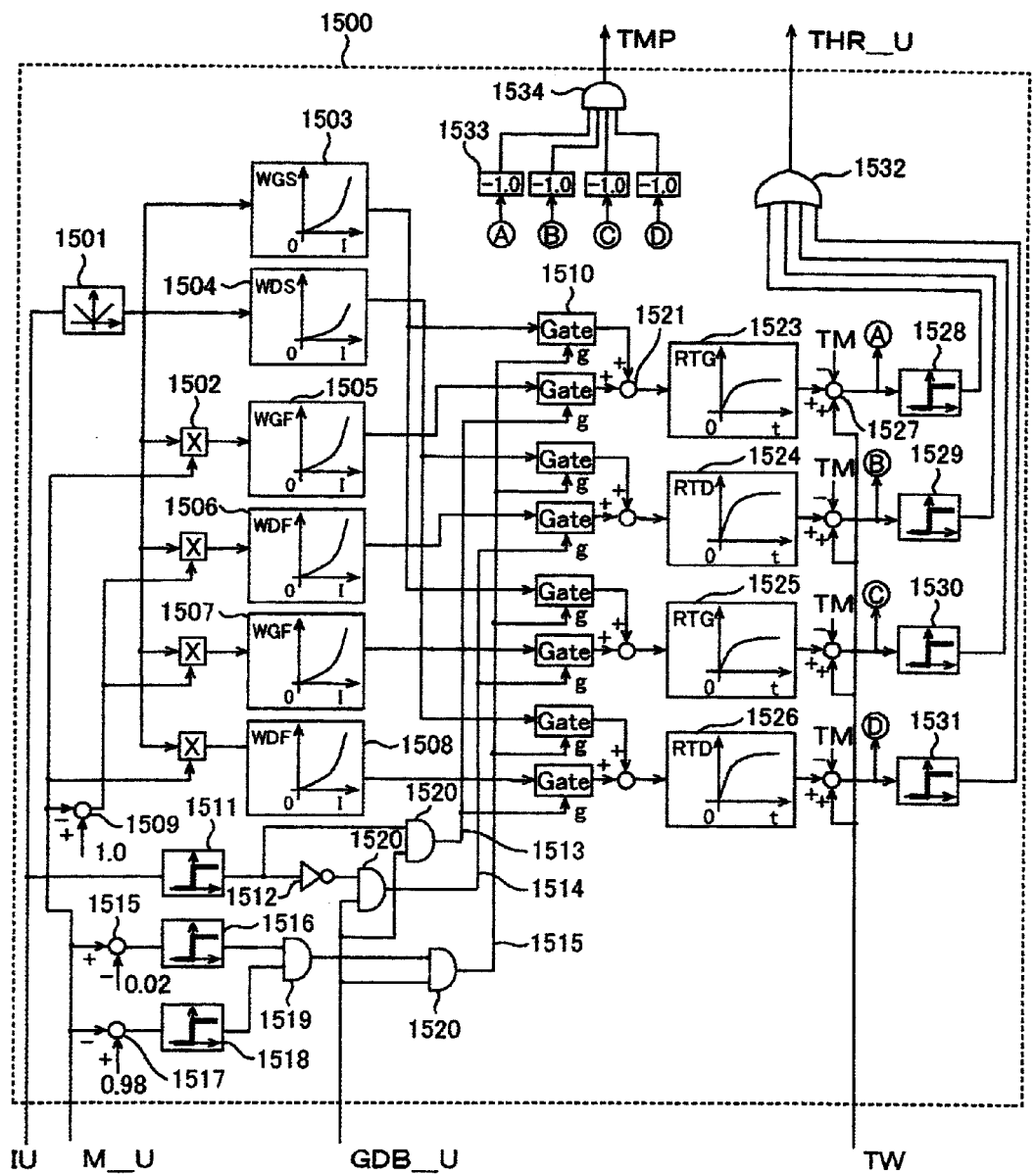
FIG. 9 shows a configuration of an IGBT temperature protection unit 1500.

FIG. 9 shows an example of the temperature protection circuit 1500. While FIG. 9 represents the U phase, the configuration is the same also for U and W phases.

First, an absolute value of the excitation current IU is calculated by 1501, and function generators 1503, 1504 calculate switching losses of the IGBTs (UPG, UNG) and diodes (UPD, UND).

A product of the absolute value of the excitation current IU and a conduction ratio is calculated by a multiplier 1502 and then fed to function generators 1505 (for UPG device), 1506 (for UPD device), 1507 (for UNG device) and 1508 (for UND device) to determine forward voltage drop losses of the devices. The conduction ratios of the UPG device and UND device are equal to M_U and those of the UNG device and UPD device are equal to (1−M_U). The conduction ratios of the latter are calculated by a subtractor 1509.

Decision logic circuits to determine in which device the loss has occurred produce an on (level 1) output when a loss occurs and an off (level 0) output when there is no loss. The value of the loss generated and the decision result are fed to gate circuits 1510. The gate circuits 1510, when their input signal or the decision circuit output g is on, output the input signal with a gain of 1 and, when off, produce an output of 0.

A decision on the polarity of the excitation current is done by a comparator 1511 and a NOT logic circuit 1512. When the excitation current IU is positive, a signal 1513 is turned on; and when it is negative, a signal 1514 is turned on.

A subtractor 1515 and a comparator 1516 together produce a high-level output when the gate command M_U is greater than a PWM modulation factor lower limit (0.02 in the example shown). A subtractor 1517 and a comparator 1518 together produce a high-level output when the gate command M_U is lower than a PWM modulation factor upper limit (0.98 in the example shown). This causes an AND logic circuit 1519 to turn on when the device is in a switching operation and off when the device is holding the gate level. These output signals are issued through an AND logic circuit 1520 if the gate block GDB_U is at on-level and the power converter 30 is in operation.

Adders 1521 calculate a total loss for each device by adding a switching loss and a forward voltage drop loss. Temperature calculators 1523 (for UPG device), 1524 (for UPD device), 1525 (for UNG device) and 1526 (for UND device) are phase delay calculation circuits that simulate a sum of a transient thermal resistance between the device junction and the device base and a transient thermal resistance of cooling fins. An output of each adder-subtractor 1527 additionally takes in the cooling water inlet temperature TW and the temperature upper limit TM and outputs a difference from the temperature upper limit TM.

An output of comparator 1528, 1529, 1530, 1531 turns on when the temperature of the associated device UPG, UPD, UNG, UND, respectively, is abnormal. An OR logic circuit 1532 turns on its output—temperature anomaly signal THR_U—when the temperature is abnormal with any of these devices. The outputs of the four adders 1527 also are inverted in sign by 1533 to produce temperature margins for four devices, the minimum of which is output from 1534.

In addition to the variable-speed electric machines generally used in wind power generation systems shown in the above embodiments, this invention is also applicable to variable speed power generation systems such as pumped storage variable speed generator-machine systems. It can also be applied to other than the variable speed systems.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A doubly-fed motor/generator comprising:
a wound-rotor induction machine having its stator side armature winding connected to an electric power grid;
a first power converter having three-phase bridge connected arms of an IGBT as a self-turn-off power device and a free-wheeling diode or a MOSFET as a self-turn-off power device, each of the arms having its AC side terminals connected to a rotor side excitation winding of the wound-rotor induction machine, wherein the first power converter pulse-width-modulation-controls the self-turn-off power devices;
a DC capacitor connected between DC side terminals of the first power converter;
a second power converter having its DC side terminals connected to both terminals of the DC capacitor and its AC side terminals connected to the power grid;
an excitation current sensor to detect a current flowing in an excitation winding of the wound-rotor induction machine;
an excitation current controller to calculate an excitation current command value for a slip frequency equal to a difference between a grid frequency and a rotor frequency of the wound-rotor induction machine and to output a first pulse command that causes the detected excitation current value from the excitation current sensor to match the excitation current command value, the first firing pulse command being fed to the self-turn-off power devices of the first power converter;
a pulse command controller having a function to identify a phase with a minimum absolute current value sent from the excitation current sensor, the pulse command controller being adapted to give an on/off-fixed firing pulse to self-turn-off power devices between two phases excluding the minimum current phase and the positive and negative poles so as to charge the DC capacitor, give a pulse modulation factor firing pulse calculated from the detected current value of the minimum current phase to self-turn-off power devices between the minimum current phase and positive and negative poles, and output the pulse modulation factor firing pulse and the on/off-fixed firing pulse as a second pulse command; and
a pulse switching controller to switch the firing pulse command between the first pulse command and the second pulse command bidirectionally for output to the first power converter, the pulse switching controller being adapted to switch the firing pulse command from the first pulse command to the second pulse command under conditions including one that any of the absolute values of the detected current values from the excitation current sensor exceeds an overcurrent preset level 1 and to switch from the second pulse command to the first pulse command under conditions including one that the absolute values of all the detected three-phase current values from the excitation current sensor fall to or below an overcurrent preset level 2.

2. The doubly-fed motor/generator according to claim 1, wherein, when the absolute value of any of the detected current values from the excitation current sensor exceeds the overcurrent preset level 1, a firing pulse constituting the second pulse command is issued to the self-turn-off power devices between the phase with the minimum absolute current value or the third-largest-current phase and the positive and negative poles;
wherein, when the detected absolute current value of the minimum current phase or the third-largest-current phase is equal to or lower than the preset level, the pulse modulation factor is held to 50%;
wherein, when the detected absolute current value of the minimum current phase or the third-largest-current phase exceeds the preset level, the firing pulse is held to on-state or off-state to charge the DC capacitor.

3. The doubly-fed motor/generator according to claim 1, wherein, when the absolute value of any of the detected current values from the excitation current sensor exceeds the overcurrent preset level 1, a firing pulse constituting the second pulse command is issued to the self-turn-off power devices between the phase with the minimum absolute current value or the third-largest-current phase and the positive and negative poles;
wherein, when the detected absolute current value of the minimum current phase or the third-largest-current phase is equal to or lower than the preset level, the pulse modulation factor is held to 50%;
wherein, when the detected absolute current value of the minimum current phase or the third-largest-current phase exceeds the preset level, the firing pulse is held to on-state or off-state to discharge the DC capacitor.

4. The doubly-fed motor/generator according to claim 1, further comprising:
a rectifier circuit connected to the power grid, the rectifier circuit having its negative side output terminal connected to the negative side terminal of the DC capacitor and its positive side output terminal connected to a collector of a second diode, the DC capacitor having its positive side terminal connected to a collector of a first diode;
a high value selection diode circuit made up of the first and second diode with their emitters commonly connected; and
a DC voltage regulator having its positive side input terminal connected with the emitter of the high value selection diode circuit and its negative side input terminal connected with the negative side terminal of the DC capacitor, the DC voltage regulator having its output connected as a power supply to the excitation current controller.

5. The doubly-fed motor/generator according to claim 1, further comprising:
a DC voltage detector to detect a terminal voltage of the DC capacitor; and
an active DC voltage suppressor circuit having a resistor and a self-turn-off power device PN serially connected;
wherein the DC voltage detector and the active DC voltage suppressor circuit are connected parallelly between the terminals of the DC capacitor;
wherein, when the detected DC voltage value exceeds a preset range, the self-turn-off power device PN of the active DC voltage suppressor circuit is on/off-controlled to suppress the DC voltage.

6. The doubly-fed motor/generator according to claim 1, further comprising:
a passive voltage suppressor circuit made up of a non-linear resistor of zinc oxide or the like parallelly connected between the terminals of the DC capacitor;
wherein, when the terminal voltage of the DC capacitor rises close to an upper limit, the passive voltage suppressor circuit is triggered to start conduction to suppress the DC voltage.

7. The doubly-fed generator according to claim 1, further comprising:
a current bypass circuit provided between the rotor side excitation winding of the wound-rotor induction machine and the excitation current sensor;
wherein an overcurrent preset level 3 is greater than the overcurrent preset level 1 and, when any of the detected absolute current values from the excitation current sensor exceeds the overcurrent preset level 3, the current bypass circuit is triggered to be turned on and all the firing commands to the self-turn-off power devices of the first power converter are made off.

8. The doubly-fed motor/generator according to claim 1, further comprising:
a current bypass circuit and a DC voltage detector to detect a voltage of the DC capacitor, both provided between the rotor side excitation winding of the wound-rotor induction machine and the excitation current sensor;
wherein, when the voltage from the DC voltage detector exceeds a preset range, the current bypass circuit is triggered to be turned on and all the firing commands to the self-turn-off power devices of the first power converter are made off.

9. The doubly-fed motor/generator according to claim 1, further comprising:
a temperature estimation circuit to estimate heat generated by the power devices using the excitation currents from the excitation current sensor and the firing commands to the first power converter and to supply the estimated heat value to a phase delay circuit that simulates a thermal capacity;
wherein, when a temperature estimated by the temperature estimation circuit exceeds a preset value, the current bypass circuit is triggered to be turned on and all the firing commands to the self-turn-off power devices of the first power converter are made off.

10. A doubly-fed variable-speed electric machine having functions of the doubly-fed generator of claim 1 and of a variable-speed electric machine.

11. A doubly-fed motor/generator comprising:
a wound-rotor induction machine having its stator side armature winding connected to an electric power grid;
a first power converter having three-phase bridge connected arms of an IGBT as a self-turn-off power device and a free-wheeling diode or a MOSFET as a self-turn-off power device, each of the arms having its AC side terminals connected to a rotor side excitation winding of the wound-rotor induction machine, wherein the first power converter pulse-width-modulation-controls the self-turn-off power devices;
a DC capacitor connected between DC side terminals of the first power converter;
a second power converter having its DC side terminals connected to both terminals of the DC capacitor and its AC side terminals connected to the power grid;
an excitation current sensor to detect a current flowing in an excitation winding of the wound-rotor induction machine;
an excitation current controller to calculate an excitation current command value for a slip frequency equal to a difference between a grid frequency and a rotor frequency of the wound-rotor induction machine and to output a first pulse command that causes the detected excitation current value from the excitation current sensor to match the excitation current command value, the first firing pulse command being fed to the self-turn-off power devices of the first power converter;
a pulse command controller having a function to identify the three phases as a largest-current phase, a second-largest-current phase and a third-largest-current phase in order of decreasing magnitude of absolute current value sent from the excitation current sensor, the pulse command controller being adapted to check a polarity of the detected current value of the largest-current phase, fix to a turn-on side the firing pulse to either a self-turn-off power device P1 between the largest-current phase and a positive pole or a self-turn-off power device N1 between the largest-current phase and a negative pole so as to charge the DC capacitor, fix to a turn-off side the firing pulse to the other self-turn-off power device, fix the firing pulse to a self-turn-off power device P2 between the second-largest-current phase and the positive pole to the same side as the firing pulse to the self-turn-off power device N1 and fix the firing pulse to the a self-turn-off power device N2 between the second-largest-current phase and the negative pole to the same side as the firing pulse to the self-turn-off power device P1, and output a firing pulse of a pulse modulation factor calculated from the detected current value for the third-largest-current phase as a second firing pulse command to a self-turn-off power device P3 between the third-largest-current phase and the positive pole and to a self-turn-off power device N3 between the third-largest-current phase and the negative pole; and a pulse switching controller to switch the firing pulse command between the first pulse command and the second pulse command bidirectionally for output to the first power converter, the pulse switching controller being adapted to switch the firing pulse command from the first pulse command to the second pulse command under conditions including one that any of the absolute values of the detected current values from the excitation current sensor exceeds an overcurrent preset level 1 and to switch from the second pulse command to the first pulse command under conditions including one that the absolute values of all the detected three-phase current values from the excitation current sensor fall to or below an overcurrent preset level 2.

12. A doubly-fed motor/generator comprising:

a wound-rotor induction machine having its three-phase stator side windings connected to an electric power grid;

a first power converter having semiconductor power devices connected at their AC side terminals to the three-phase rotor side windings of the wound-rotor induction machine;

a DC capacitor connected between DC side terminals of the first power converter;

a second power converter having its DC side terminals connected to both terminals of the DC capacitor and its AC side terminals connected to the power grid;

an excitation current sensor to detect an excitation current of each phase supplied from the first power converter; and an excitation current controller to output a first firing pulse command to the semiconductor power devices of the first power converter to control the excitation current produced by the first power converter according to an operation condition of the wound-rotor induction machine;

wherein the three phases are identified as a largest-current phase, a second-largest-current phase and a third-largest-current phase in order of decreasing magnitude of absolute current value sent from the excitation current sensor, the largest-current phase having an absolute current value of the excitation current that is a maximum among the excitation currents of the three phases, a polarity of a detected current value of the largest-current phase is checked, and wherein, when a detected absolute current value of a minimum current phase or the third-largest-current phase exceeds an overcurrent preset level, the firing pulse to the semiconductor power devices of each phase in the first power converter is held to an on-state or an off-state to charge the DC capacitor.

13. The doubly-fed motor/generator according to claim 12, wherein a circuit between the positive and negative side terminals of the DC capacitor is used as a power supply for the excitation current controller.

14. The doubly-fed motor/generator according to claim 13, further comprising:

a DC voltage regulator connected between the positive and negative side terminals of the DC capacitor;

wherein an output of the DC voltage regulator is used as a power supply for the excitation current controller.

15. A doubly-fed variable-speed electric machine configured to operate as a doubly-fed generator and a variable-speed electric machine, the doubly-fed variable-speed electric machine comprising:

a wound-rotor induction machine having its stator side armature winding connected to an electric power grid;

a first power converter having three-phase bridge connected arms of an IGBT as a self-turn-off power device and a free-wheeling diode or a MOSFET as a self-turn-off power device, each of the arms having its AC side terminals connected to a rotor side excitation winding of the wound-rotor induction machine, wherein the first power converter pulse-width-modulation-controls the self-turn-off power devices;

a DC capacitor connected between DC side terminals of the first power converter;

a second power converter having its DC side terminals connected to both terminals of the DC capacitor and its AC side terminals connected to the power grid;

an excitation current sensor to detect a current flowing in an excitation winding of the wound-rotor induction machine;

an excitation current controller to calculate an excitation current command value for a slip frequency equal to a difference between a grid frequency and a rotor frequency of the wound-rotor induction machine and to output a first pulse command that causes the detected excitation current value from the excitation current sensor to match the excitation current command value, the first firing pulse command being fed to the self-turn-off power devices of the first power converter;

a pulse command controller having a function to identify a phase with a minimum absolute current value sent from the excitation current sensor, the pulse command controller being adapted to give an on/off-fixed firing pulse to self-turn-off power devices between two phases excluding the minimum current phase and the positive and negative poles so as to charge the DC capacitor, give a pulse modulation factor firing pulse calculated from the detected current value of the minimum current phase to self-turn-off power devices between the minimum current phase and positive and negative poles, and output the pulse modulation factor firing pulse and the on/off-fixed firing pulse as a second pulse command;

a pulse switching controller to switch the firing pulse command between the first pulse command and the second pulse command bidirectionally for output to the first power converter, the pulse switching controller being adapted to switch the firing pulse command from the first pulse command to the second pulse command under conditions including one that any of the absolute values of the detected current values from the excitation current sensor exceeds an overcurrent preset level 1 and to switch from the second pulse command to the first pulse command under conditions including one that the absolute values of all the detected three-phase current values from the excitation current sensor fall to or below an overcurrent preset level 2.

16. The doubly-fed variable-speed electric machine according to claim 15,
wherein, when the absolute value of any of the detected current values from the excitation current sensor exceeds the overcurrent preset level 1, a firing pulse constituting the second pulse command is issued to the self-turn-off power devices between the phase with the minimum absolute current value or the third-largest-current phase and the positive and negative poles;
wherein, when the detected absolute current value of the minimum current phase or the third-largest-current phase is equal to or lower than the preset level, the pulse modulation factor is held to 50%; and
wherein, when the detected absolute current value of the minimum current phase or the third-largest-current phase exceeds the preset level, the firing pulse is held to on-state or off-state to charge the DC capacitor.

17. The doubly-fed variable-speed electric machine according to claim 15,
wherein, when the absolute value of any of the detected current values from the excitation current sensor exceeds the overcurrent preset level 1, a firing pulse constituting the second pulse command is issued to the self-turn-off power devices between the phase with the minimum absolute current value or the third-largest-current phase and the positive and negative poles;
wherein, when the detected absolute current value of the minimum current phase or the third-largest-current phase is equal to or lower than the preset level, the pulse modulation factor is held to 50%;
wherein, when the detected absolute current value of the minimum current phase or the third-largest-current phase exceeds the preset level, the firing pulse is held to on-state or off-state to discharge the DC capacitor.

18. The doubly-fed variable-speed electric machine according to claim 15, further comprising:
a rectifier circuit connected to the power grid, the rectifier circuit having its negative side output terminal connected to the negative side terminal of the DC capacitor and its positive side output terminal connected to a collector of a second diode, the DC capacitor having its positive side terminal connected to a collector of a first diode;
a high value selection diode circuit made up of the first and second diode with their emitters commonly connected; and
a DC voltage regulator having its positive side input terminal connected with the emitter of the high value selection diode circuit and its negative side input terminal connected with the negative side terminal of the DC capacitor, the DC voltage regulator having its output connected as a power supply to the excitation current controller.

19. The doubly-fed variable-speed electric machine according to claim 15, further comprising:
a DC voltage detector to detect a terminal voltage of the DC capacitor; and
an active DC voltage suppressor circuit having a resistor and a self-turn-off power device PN serially connected;
wherein the DC voltage detector and the active DC voltage suppressor circuit are connected parallelly between the terminals of the DC capacitor;
wherein, when the detected DC voltage value exceeds a preset range, the self-turn-off power device PN of the active DC voltage suppressor circuit is on/off-controlled to suppress the DC voltage.

20. The doubly-fed variable-speed electric machine according to claim 15, further comprising:
a passive voltage suppressor circuit made up of a non-linear resistor of zinc oxide or the like parallelly connected between the terminals of the DC capacitor;
wherein, when the terminal voltage of the DC capacitor rises close to an upper limit, the passive voltage suppressor circuit is triggered to start conduction to suppress the DC voltage.

* * * * *